Figure 3:
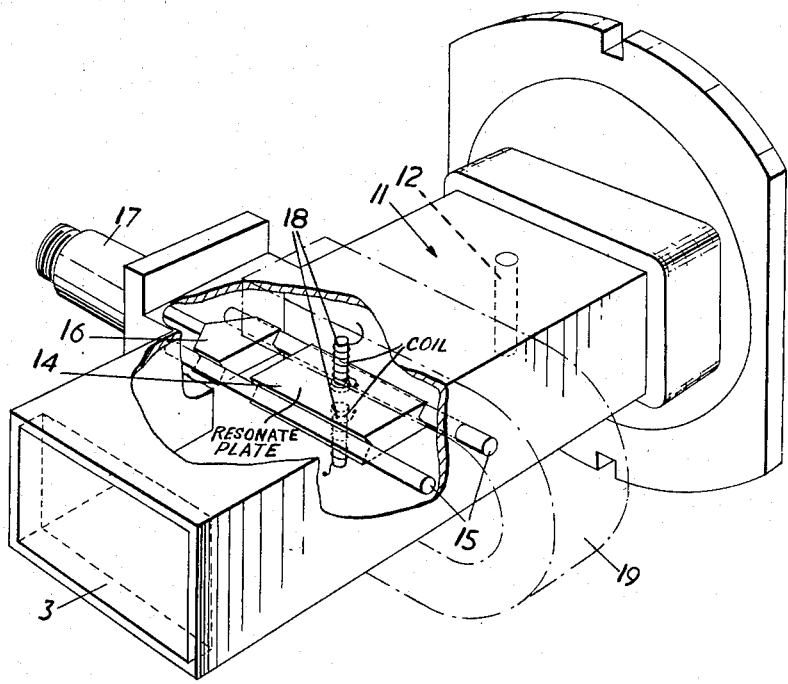

Feb. 7, 1961    A. F. H. THOMSON    2,971,087
MICROWAVE MIXERS
Filed June 17, 1958    2 Sheets-Sheet 1
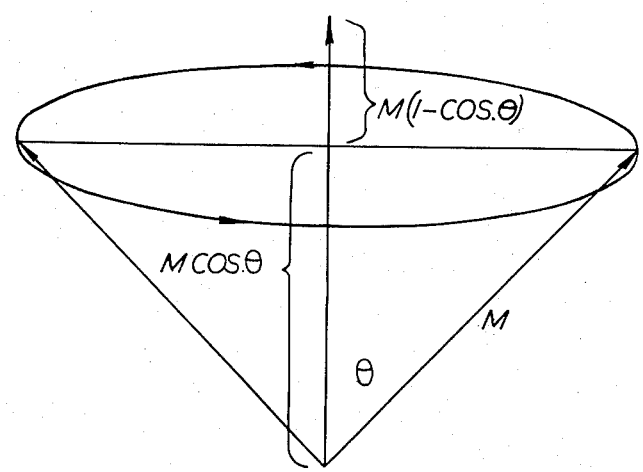
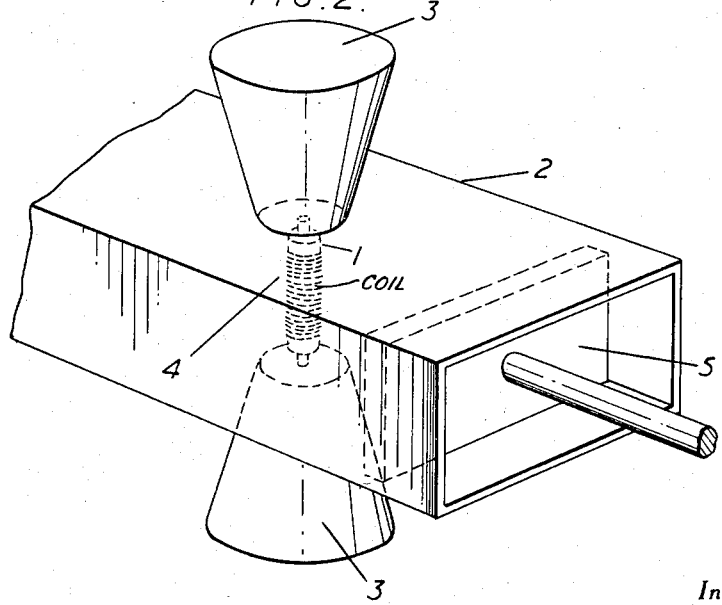
*Inventor*
AMHERST FELIX HOME THOMSON
*Attorney*

United States Patent Office 2,971,087
Patented Feb. 7, 1961

2,971,087

MICROWAVE MIXERS

Amherst Felix Home Thomson, Bishop's Stortford, England, assignor to National Research Development Corporation, London, England, a British corporation Filed June 17, 1958, Ser. No. 742,626

1 Claim. (Cl. 250—20)

It is well known that the ferromagnetism of materials is due to alignment of the spin directions of certain electrons in the atoms composing the materials. It is also known that in materials such as certain ferrites, which are insulators, it is possible to influence the spin directions by applying a radio frequency field. In particular if the spins are substantially aligned by means of a static magnetic field and are disturbed from their direction of alignment by an RF field at right angles, they tend to precess around the direction of the steady field in the manner of a spinning top at a frequency determined by the physical constants of the electron and the value of the steady field which they experience. If the frequency of the RF is made equal to this precession rate the angle of precession may become large and substantial absorption of RF power occurs.

In the present invention use is made of this phenomenon to provide a square law detector or a frequency changer. This has considerable advantages over the crystal which is normally used at microwave frequencies for this purpose. There is little danger of burn out from high incident powers and little possibility of departure from the characteristic rectification law which unlike that of a crystal is accurately square law.

The method of achieving these desirable properties is as follows. The magnetisation of a body of material is proportional to the total number of contributing spinning electrons (which can be considered as elementary magnets) per unit volume and the cosine of the angle between the directions of the spins and that in which the magnetisation is being measured. If the spinning electrons are precessing around an applied field in a cone of angle $\theta$ then the measured magnetisation will be reduced by $\cos \theta$ below that measured in the absence of precession. In other words, on causing precession of angle $\theta$ the total magnetisation is reduced by a factor $(1-\cos \theta)$. For small angles this approximates closely to $\theta^2/2$. Fig. 1 of the accompanying drawings helps to make this clear. Now it is to be expected that the angle of precession will be proportional to the amplitude of the magnetic component of the RF field and experiment confirms this. The absorbed power which is proportional to $H^2$ will be proportional to $\theta^2$ and to the change in magnetisation. The flux change due to this change in magnetisation will give rise to a voltage across a winding enclosing the ferrite body. If this voltage is amplified and integrated a voltage is obtained which corresponds always to the magnetic flux in the body, and is therefore proportional to the RF power. The arrangement is a perfect square law detector.

The invention, therefore, comprises broadly a detector or frequency changer consisting of a ferrite body in which the directions of electron spins of its constituent atoms can be influenced by applied radio frequency fields and a magnet by which the body can be subjected to a steady magnetic field to align the directions of electron spins, means of applying RF fields to the ferrite body so as to cause precession of the electron spin directions and means for detecting or determining the resulting magnetisation or change of magnetisation.

Of many possible physical realisations, one is shown diagrammatically in Fig. 2 of the accompanying drawings. Here the ferrite body 1 is mounted across a rectangular-section waveguide 2 and between the poles 3 of a magnet, and is wound with a coil 4 used for detecting flux changes in the ferrite. The waveguide is fitted with a movable plunger 5 for matching the waveguide termination.

By analogy with a crystal or a diode it is evident that the superposition of two RF signals of different frequencies will result in a voltage output at a frequency equal to the difference between the two. In this arrangement the device is a frequency changer or mixer and can be applied in well known ways to a superheterodyne receiver. A practical form of mixer is illustrated in Fig. 3 of the accompanying drawings.

As large amounts of local oscillator power are required for this type of mixer compared with the conventional crystal mixer, it is desirable to combine two assemblies into one in such a manner that the outputs are balanced so that noise from the local oscillator is cancelled out and produces only a negligible signal to the intermediate frequency amplifier. The use of a balanced system is well known in crystal mixer design where a slight improvement in performance results even though the local oscillator power is relatively small. Another well known advantage of balanced systems is that less local oscillator power is conveyed to the aerial and there lost as radiation.

One convenient arrangement of this kind is that illustrated in the Fig. 3. The body 11, which is of rectangular waveguide, is formed into a cavity one guide wavelength long by means of the metal post 12 and the movable plunger 13. Midway between these a metal plate 14 is supported on two fused silica rods 15. The length of the plate is made so that it resonates as a dipole at the local oscillator frequency, and the width is made equal to one quarter of the guide wavelength at the signal frequency. The plate is excited to resonate at the local oscillator frequency by the proximity of the probe 16 connected to the local oscillator (not shown) by means of the coaxial line 17. The rod of suitable ferromagnetic material 18 is in two halves mounted across the cavity at its centre bridging the two spaces between the plate 14 and the walls of the cavity. Coils of wire are wound on each half of the rods 18 and are connected in opposition. The two ends of the coils are connected in a suitable manner to the intermediate frequency amplifier. The rods 18 are magnetised along their length by means of a magnet 19 of suitable strength, mounted outside the cavity.

In order to explain the operation of the device it is necessary to remember that when an oscillating magnetic field is applied to a ferromagnetic at right angles to a steady field, at the frequency for resonance of the spin system, the behaviour is exactly the same as for one of the circularly polarised components into which the oscillating field can be resolved. In other words, having resolved the field into two circularly polarised fields of opposite sense, only one of these produces any change in magnetisation.

Now the magnetic field due to the resonance of the plate 14 is along the axis of the waveguide cavity but in opposite sense above and below the plate. The magnetic field due to the cavity resonance is, however, along the length of the plate both above and below. Resolving these fields into circularly polarised components and ignoring, say, the left hand one, if the right hand component of the plate resonance is in phase with the right hand component of the cavity resonance above the plate, then it will be out of phase below and vice versa. The existence of a signal in the cavity thus has the effect of increasing the effective excitation of one half of the rod 18 while decreasing that of the other half. The voltage developed across the coils (connected in opposition) being due to the difference in magnetisation of the two halves of the rod is therefore proportional to the signal power. The difference in frequency between the incoming signal and the local oscillator can be regarded as a slow change in the relative phases. If at one moment they are in phase above the plate and out of phase below then one quarter cycle of the difference frequency later they will be in quadrature above and below. Another quarter cycle later they will be out of phase above and in phase below, and so on. The difference between the magnetisations of the two halves of the rod therefore varies sinusoidally at the difference (intermediate) frequency. A suitable ferrite is magnesium manganese.

I claim:

A microwave mixer comprising a cavity tunable to resonate at the frequency of a received signal, a metal plate resonant to a local oscillator frequency located across the middle of the cavity and excitable by the local oscillations, a ferrite rod projecting from said metal plate, the ferrite rod being disposed transverse to and magnetisable by the magnetic component of the radio frequency fields thus set up in the cavity, magnetic means producing a steady magnetic field along the axis of the ferrite rod to align the directions of electron spins of the constituent atoms of the rod, coil means surrounding said rod, intermediate frequency signals being induced into said coil by changes of magnetisation in the ferrite rod resulting from precession of the electron spin directions thereof caused by the magnetic component of the received signal fields.

References Cited in the file of this patent
UNITED STATES PATENTS

| | | |
|---|---|---|
| 2,645,758 | Van de Lindt | July 14, 1953 |
| 2,802,183 | Read | Aug. 6, 1957 |
| 2,830,267 | Broussand et al. | Apr. 8, 1958 |